Sept. 17, 1940. H. D. HUME ET AL 2,215,178
HARVESTING MACHINE
Filed Aug. 16, 1938 2 Sheets-Sheet 1
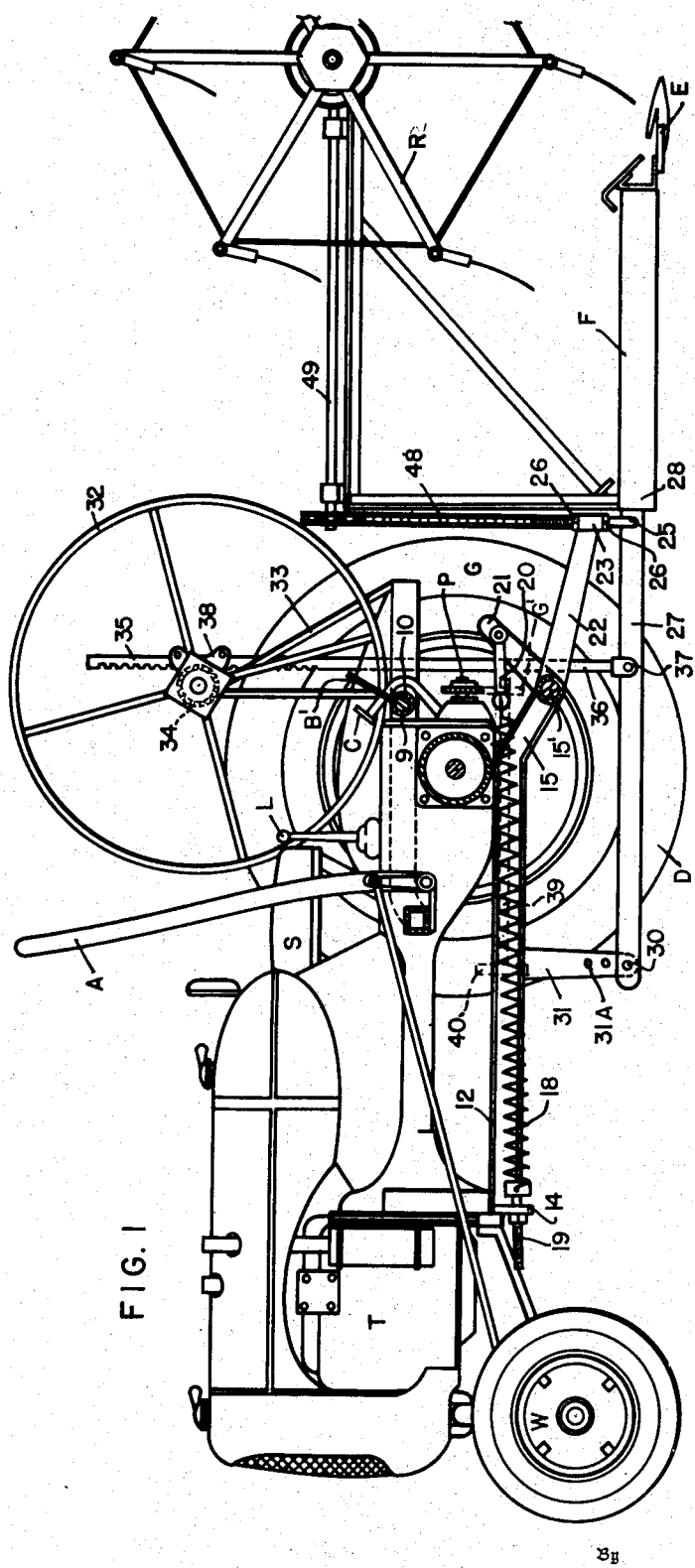
Horace D. Hume
James E. Love
Inventors
Herbert E. Smith
Attorney

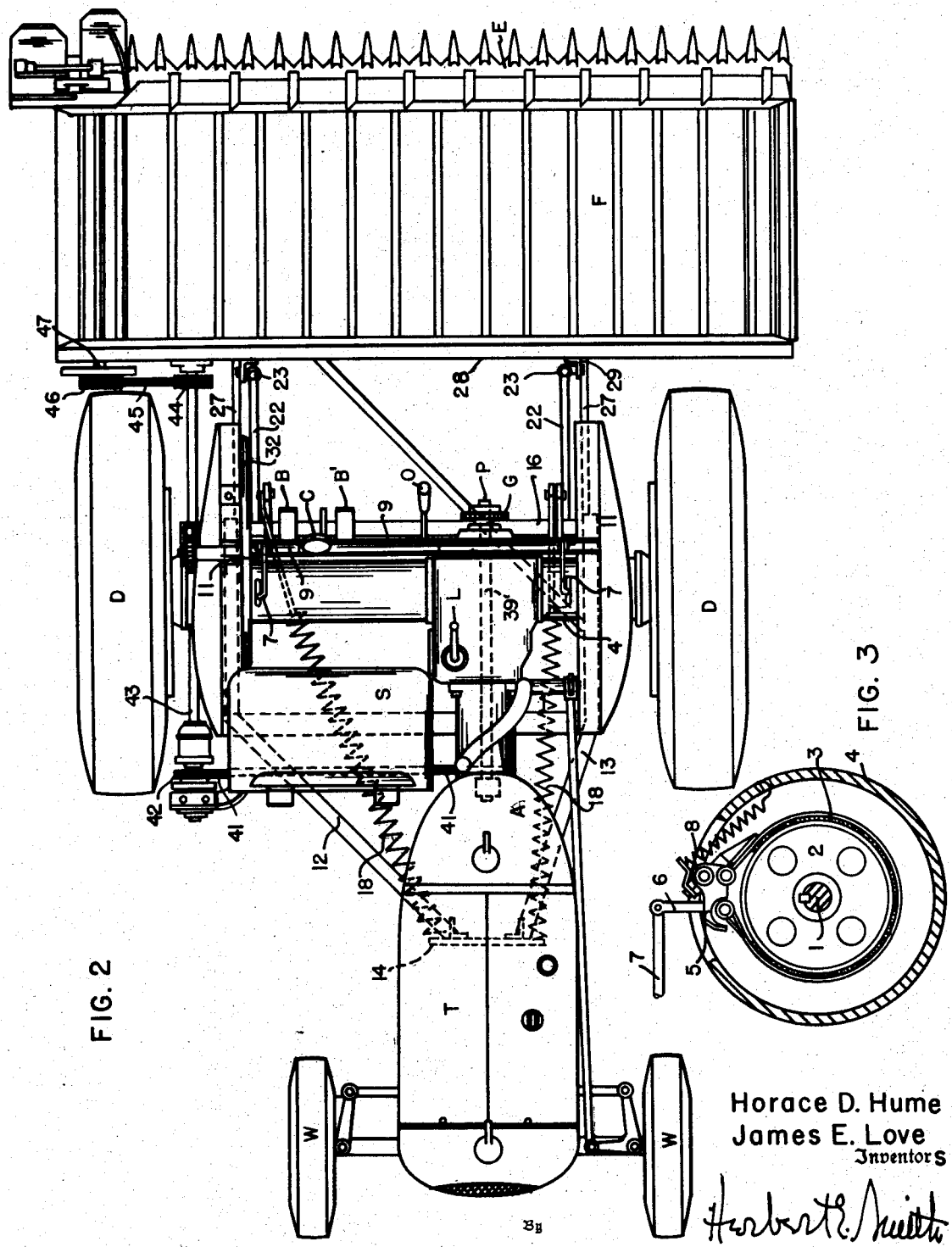

Patented Sept. 17, 1940

2,215,178

UNITED STATES PATENT OFFICE 2,215,178

HARVESTING MACHINE

Horace D. Hume and James E. Love,
Garfield, Wash.

Application August 16, 1938, Serial No. 225,103

4 Claims. (Cl. 56—23)

Our present invention relates to improvements in harvesting machines, and specifically to an equalized or counterbalanced frame that is employed between a farm-tractor and a harvester or other agricultural implement that is operated by a power take-off from the tractor, and therefore we do not limit the adaptation of our invention to harvesting machines.

For convenience of illustration we have shown our invention as a counterbalanced support for a harvester employing a front central reciprocating cutter of the sickle type, an overhead rotary reel for passing the crop to the cutter, and a draper or endless conveyer extending transversely of the implement for disposing of the cut crop, and this support or counterbalanced frame is attached to the tractor that is arranged at the rear of the harvester.

For this purpose we employ a counterbalanced frame that is simple in construction and composed of a minimum number of parts which permit of its convenient assembly and facile attachment to a standard farm-tractor. Means which are readily accessible to the driver of the implement are also employed for easy adjustment of the implement for adapting it to varying conditions in crops and in the soil surface, as well as for elevating the harvester implement to inoperative position, as for purposes of transportation.

Our invention consists in certain novel combinations and arrangements of parts between the farm-tractor and the implement as will hereinafter be more fully set forth and claimed. In the accompanying drawings we have illustrated one complete example of the physical embodiment of our invention wherein the parts are combined and arranged in accordance with one mode we have devised for the practical application of the principles of our invention, but it will be understood that changes and alterations may be made in these exemplifying structures, within the scope of our claims, without departing from the principles of the invention.

Figure 1 is a view in side elevation of a tractor-operated harvesting implement in which our invention is embodied, the near front drive wheel of the tractor being omitted for convenience of illustration.

Figure 2 is a top plan view of the implement of Figure 1 with the rotary reel omitted.

Figure 3 is a sectional detail view of one of the dual brakes of the tractor that may be employed in steering and maneuvering the implement.

Figure 4 is an enlarged, detail, plan view of parts of the counterbalanced frame, as at the left side of the implement in Figure 2.

In order that the general assembly and arrangement of parts may readily be understood we have illustrated a typical farm-tractor as T with the pair of front drive wheels D and the rear steering wheels W, the front wheels being spaced wide apart with a broad tread to accommodate the attachment of the implement that is mounted in front of the tractor. The tractor is equipped with a seat S located in position for ready access by the driver to the gear shift lever L, and the steering lever A that is connected in usual manner to the rear steering wheels W, W.

The usual brake pedals B and B' are located at the opposite sides of the clutch brake C, and these brake pedals are manipulated for operating the brakes of the two drive wheels D, D, so that, in addition to the use of the steering wheels W, W, the implement may also be maneuvered and steered with the brakes. One of the brake devices is illustrated in Figure 3, in connection with the front axle 1 of the tractor, where the brake drum 2 and brake band 3 are enclosed within the housing 4. By means of the toggle 5 connecting the ends of the brake band, with the lever 6 and link 7, which is connected with a brake pedal B', the brakes are applied against tension of the return spring 8. The brake pedals B B' are rigidly secured to an alined pair of tubular rock shafts 9 that are mounted upon a supporting axle 10 which extends transversely of the tractor, and levers 11 are pivotally connected to the front ends of the links 7 to operate the brakes.

Power for the operating parts of the harvester is taken from the power shaft P of the tractor, which is provided with a take off gear G, a take-off clutch lever O being manipulated in connection with a suitable clutch for this purpose.

In the present exemplification of our invention a harvester is mounted in front of the tractor and extends transversely thereof. As indicated, this harvester includes a reciprocating cutter or sickle E, a rotary reel R mounted slightly in advance of and over the cutter for passing the crop to the cutter, and a transversely extending draper or endless conveyer F which receives the cut crop from the cutter, and passes it to one side of the implement.

In equipping the farm-tractor and the harvester with our invention we employ a counterbalanced and equalized frame or attachment structure that may readily be mounted on the farm-tractor, and the harvester with equal facility may readily be attached to and detached from the counterbalanced frame that is supported from beneath the tractor and between the two front driving wheels.

The counterbalanced frame of the attachment includes a pair of side bars 12 and 13, which, as indicated in Figures 1 and 2, at their rear ends are bolted to an attaching plate 14 that is rigidly fixed transversely to an under portion of the tractor. These side bars diverge outwardly toward the front of the tractor, and then extend in parallelism longitudinally of the tractor between the two driving wheels D, D. The wheels are spaced apart to approximately the width of the harvester, by means of extension members within the transmission housing of the tractor, thus accommodating the side bars, and also stabilizing the whole implement so that it may operate on a steep side hill without tendency to drift or tilt laterally.

At their front ends these side bars terminate in down-turned supports or hangers 15, and each of these hangers is fashioned with an inwardly projecting stub axle, or trunnion 15', upon which a tubular rock-shaft 16 is mounted and extends transversely of the implement. This tubular rock shaft is resiliently held against turning or rocking clock-wise by means of two equalizing springs 18, 18 extending horizontally beneath the tractor and adjustably anchored at their rear ends 19, by bolts and nuts, to the attaching plate 14. At their forward or front ends these springs are pivotally connected by links 20 to two balance lever arms 21, 21 rigid with the tubular rock shaft.

Another pair of levers or supporting arms 22 forming part of the resilient support for the harvester, are rigidly mounted near the ends of the tubular shaft 17, and as indicated in Fig. 1 these supporting arms decline forwardly when the harvester is supported or suspended in working position. At their free front ends these supporting arms are coupled, each by a sleeve 23 with other parts of the counterbalanced frame. These coupling sleeves are pivoted in the arms on pins 24, and J-bolts 25 or coupling hooks are mounted in the sleeves and secured by nuts 26 on the upper and lower threaded portion of the bolts.

These hooked coupling bolts pass through holes in and are pivotally connected with a pair of long longitudinally extending frame bars 27, to which the transversely extending harvester frame 28 is attached, as by angle plates 29, and the hooks provide a flexible, adjustable, coupling between the supporting arms 22 and the frame bars 27. The frame bars 27 extend rearwardly from the harvester frame beneath the front parallel ends of the side bars 15, and the rear ends of the frame bars are pivoted at 30, each to a bracket-hanger 31 rigid with and depending from a side bar.

The harvesting implement is thus supported in working position by the frame bars 27, and the frame bars which carry the load are supported in part by the counterbalancing or equalizing frame 12, 21, 22, and the couplings to counterbalance the load of the harvesting implement and facilitate its adjustment to desired working position.

It will be noted that the front wheels D are the traction wheels and that they are located directly at the rear of the harvesting machine and the added weight of the harvesting machine or other implement, is available to increase the tractive power of the tractor front wheels. By the use of the counterbalancing frame for the implement, in addition to imposing desirable weight on the tractive wheels, the counterbalanced frame not only relieves the rear steering wheels W of the weight of the implement, but the frame also assists in relieving the steering wheels of some of the engine-weight, so that the steering wheels may be more readily manipulated. Thus the counterbalanced frame solves the difficult problems of farmers involving sufficient weight on the traction wheels to provide tractive force required; and also relieving the steering wheels of excess weight that would interfere with the steering operations of the tractor.

The pivots 30 at the rear ends of the frame bars 27 may be vertically adjusted in the bracket-hangers 31 by selecting one of the holes 31a arranged in vertical series in the hangers, thus providing a rough adjustment for the harvesting implement.

The harvesting implement is also precisely adjustable to working position to accommodate it to varying conditions of the crop to be harvested, as well as for lifting or elevating it to inoperative position, by manipulation of a large hand-wheel 32 that is journaled in bearings in the wheel-frame 33.

The wheel-frame 33 is located above and at one side of the tractor in position for ready access of the driver to the wheel, and the wheel is equipped with a rack-wheel 34 that meshes with a rack 35 on the upper end of an adjusting bar 36 that extends downwardly and at its lower end is pivotally connected, as at 37, with the frame bars 27. The adjusting bar is guided in its movement by suitable means, as a housing 38 mounted on the wheel-frame 33. By turning the hand-wheel the frame bars 27 are swung on their pivots 30 to elevate or lower the harvesting implement, and suitable means, as a hook and anchoring chain may be employed to anchor the wheel to its frame. The weight of the harvesting implement is counterbalanced by the springs 18 and the equalizing frame including the supporting arms 22, and therefore the hand wheel may be manipulated with facility.

The sickle E, the rotary reel R, and the draper F are operated by transmission mechanism from the power take-off gear G which meshes with a gear G' on the forward end of a countershaft 39 journaled in shiftable bearings and provided at its rear end with a sprocket wheel 40 for the chain 41 that extends transversely of the tractor and passes over a sprocket wheel 42 on the longitudinally extending operating shaft 43 at the left side of the tractor. For operating the cutter and the draper, a chain drive comprising a sprocket wheel 44 on the shaft 43, chain 45, and a sprocket wheel 46 on the cutter shaft 47, is employed as indicated in Figure 2. For operating the rotary reel from this transmission mechanism a chain drive is indicated in Figure 1 at 48 for the reel-operating shaft 49.

A machine as thus described and illustrated is efficient in the performance of its functions as it is under direct control of the driver and it may be operated at unusually high speeds to pass round obstructions, and to make fast as well as short turns in harvesting the crop in a field. Such a machine is capable of cutting crops such as alfalfa, peas, or beans, especially crops that lie close to the ground, at the unusual speed of five to five and a half miles per hour. A swath is first cut along the edges of the field or fences and passed inside the field to the standing crop, then the machine is reversed in its direction to cut a second crop-swath and deliver the crop from the first two swaths to the edge of the field from which the first swath was cut, after which the cuttings may be removed. After this preliminary cutting the entire field crop is harvested by the traveling implement that is first adjusted to proper working condition and then maneuvered with facility as described.

Having thus fully described our invention, what we claim as new and desire to secure by Letters Patent is:

1. In a counterbalanced supporting frame for use with a farm-tractor having front traction wheels and rear steering wheels, and a farming implement, the combination with a pair of side bars attached at their rear ends to the tractor at a point between the front and rear wheels, of a rockable spring-held support mounted between the front ends of the side bars adjacent the traction wheels, a pair of frame-bars pivotally mounted at their rear ends adjacent the front wheels on and beneath the side bars for supporting the implement, flexible couplings between said side bars and frame bars, and means for vertically adjusting the implement and its frame.

2. In a counterbalanced frame for a tractor having front traction wheels and rear steering wheels, and an implement located in front of the front wheels, the combination with laterally spaced side bars fixed at their rear ends to the tractor, and a resiliently-held pivotal support mounted between the front ends of the side bars, of a pair of implement frame-bars pivotally mounted on their rear ends to the side bars at the rear of the traction wheels, a pair of supporting arms rigid with the support and coupled to the implement frame bars, and means for vertically adjusting the frame bars on their rear pivots.

3. In a counterbalancing frame for an implement located in front of a tractor having front traction wheels and rear steering wheels, the combination with a pair of forwardly extending side bars having their rear ends fixed to the tractor and a depending bracket on each side bar adjacent the front wheels, and a pair of implement frame-bars having their rear ends pivoted on the brackets and their front ends supporting the implement, of a rocking member mounted between and joining the front ends of the side bars, equalizing springs connecting said member with the tractor, a pair of supporting arms rigid with said member and loosely coupled to the frame-bars, and means for vertically moving said frame bars to adjust the implement.

4. In a counterbalancing frame for an implement located in front of a tractor having front traction wheels and rear steering wheels, the combination with a pair of forwardly extending side bars fixed at their rear ends to the tractor, said bars having depending brackets adjacent the front wheels, and inwardly projecting opposed trunnions at their front ends, of a pair of implement frame-bars pivoted at their rear ends to the brackets and supporting the implement at their front ends, a tubular shaft rotatable on said trunnions, forwardly projecting supporting arms rigid with the shaft and loosely coupled at their front ends to the frame-bars, equalizing springs connecting the shaft with a part of the tractor, and means for vertically adjusting the frame bars and implement.

HORACE D. HUME.
JAMES E. LOVE.